(12) United States Patent
Bedard

(10) Patent No.: US 7,380,628 B2
(45) Date of Patent: Jun. 3, 2008

(54) SNOWMOBILE TRACK SCRAPER

(75) Inventor: Yvon Bedard, Orford (CA)

(73) Assignee: Bombardier Recreational Products Inc., Valcourt (CA)

(*) Notice: Subject to any disclaimer, the term of this patent is extended or adjusted under 35 U.S.C. 154(b) by 377 days.

(21) Appl. No.: 10/995,519

(22) Filed: Nov. 24, 2004

(65) Prior Publication Data

US 2005/0127751 A1 Jun. 16, 2005

Related U.S. Application Data

(60) Provisional application No. 60/524,053, filed on Nov. 24, 2003.

(51) Int. Cl.
  B62M 27/02 (2006.01)
  B62D 25/16 (2006.01)
  B60S 1/68 (2006.01)
(52) U.S. Cl. .................. 180/190; 305/107
(58) Field of Classification Search ........ 180/183, 180/184, 190, 191, 192, 194; 305/107, 108, 305/110, 135
  See application file for complete search history.

(56) References Cited

U.S. PATENT DOCUMENTS

| | | | | |
|---|---|---|---|---|
| 2,637,603 A | * | 5/1953 | Cartlidge | 305/107 |
| 3,236,568 A | * | 2/1966 | Bombardier et al. | 280/28.5 |
| 3,861,762 A | * | 1/1975 | Freedy et al. | 305/100 |
| 4,134,622 A | * | 1/1979 | Krolak et al. | 305/107 |
| 4,531,787 A | * | 7/1985 | Hart et al. | 305/109 |
| 4,818,040 A | * | 4/1989 | Mezzancella et al. | 305/107 |
| 5,203,424 A | * | 4/1993 | Gogo et al. | 180/190 |
| 5,226,703 A | * | 7/1993 | Norman | 305/110 |
| 5,697,683 A | * | 12/1997 | Arulandu et al. | 305/110 |
| 5,725,292 A | * | 3/1998 | Keedy et al. | 305/110 |
| 6,007,166 A | * | 12/1999 | Tucker et al. | 305/135 |
| 6,491,125 B2 | * | 12/2002 | Girouard et al. | 180/190 |
| 6,527,347 B2 | * | 3/2003 | Brawley et al. | 301/110 |
| 6,921,140 B2 | * | 7/2005 | Simons et al. | 305/107 |

* cited by examiner

*Primary Examiner*—Lesley D. Morris
*Assistant Examiner*—Marc A Scharich
(74) *Attorney, Agent, or Firm*—Osler, Hoskin & Harcourt LLP

(57) ABSTRACT

A snow remover for removing snow lying upon an inner surface of an endless drive track of a snowmobile includes a mounting portion and a scraping portion. The snow remover of the present invention is to be attached to a stationary structure of the snowmobile such that the scraping portion extends towards the inner surface of a lower section of the endless drive, to scrape off snow. Thus, this portion of snow is prevented from being thrown onto the riders of the snowmobile.

10 Claims, 5 Drawing Sheets

SNOWMOBILE TRACK SCRAPER

This application claims the benefit of priority to U.S. Provisional Application 60/524,053, filed on Nov. 24, 2003, the contents of which are incorporated herein by reference.

FIELD OF THE INVENTION

The present invention relates to a snowmobile, and more particularly to a track scraper for removing snow lying upon an inner side of an endless drive track of a snowmobile.

BACKGROUND OF THE INVENTION

A snowmobile travels over the snow and a lower section of the endless drive track usually sinks into the snow, which causes snow to fall onto the slide rails and the inner surface of the track. Even more so when the snowmobile is turning, because the lower section of the endless drive track is forced to slide sideways over the surface of the snow, and thus one outer lateral edge of the track digs into the snow and pushes snow onto the inner surface of the lower section of the track and the slide rail at that side.

The endless drive track generally extends laterally and outwardly past the slide rail at each side of the snowmobile. Thus, snow lying upon the inner surface of the lower section of the track between the lateral edge of the track and the slide rail at each side of the snowmobile, is traveling along with the rotation of the track and thereby picks up momentum. When this snow reaches the rear idler wheel and begins to change direction with the returning portion (the upper portion) of the track around the rear idler wheel, the snow has picked up enough momentum to be thrown away from the track upwardly as well as rearwardly and forwardly. A portion of the snow which is thrown rearwardly is stopped by a rear tail flap which is a flexible rubber piece hanging down from the rear portion of the tunnel of the snowmobile. However, the rear tail flap is normally not much wider than the width of the endless drive track such that not all of the thrown snow is stopped by the rear tail flap.

On the other hand, a portion of the snow that is thrown upwardly and forwardly is constantly thrown up onto the driver or passenger of the snowmobile. The passengers can become covered with snow and eventually when the snow melts, the passengers can get wet and cold. In a two-up snowmobile, handles are normally provided at the sides for a passenger to hold for stability while riding. The passenger's hands and fingers are constantly being covered with the upwardly and forwardly thrown snow, or worse, being hit with pieces of ice or snow crust when the snowmobile is turning under crusty snow conditions.

Furthermore, if the conditions are such that the snow is dense and packable, the dense snow lying upon the internal surface of the track and the slide rails, if not cleaned away, can freeze the endless drive track to the slide rails when the snowmobile is immobile for some length of time. This necessitates forcing the endless drive track and side rails apart in order to allow the endless drive track to rotate freely.

Therefore, there is a need for a simple structure to be provided to a snowmobile, for removing the snow lying upon the inner surface of the lower section of the endless drive track while the snowmobile is traveling.

SUMMARY OF THE INVENTION

One object of the present invention is to provide a snow remover for removing snow lying upon an inner surface of an endless drive track of a snowmobile when the snowmobile is traveling over the snow.

In accordance with one aspect of the present invention, a snow remover is provided for removing snow lying upon an inner surface of an endless drive track of a snowmobile. The snow remover comprises a mounting portion adapted to be attached to a stationary structure of a snowmobile; and a snow removing portion extending from the mounting portion towards the inner surface of the endless drive track when the snow remover is attached to the snowmobile, the snow removing portion thereby being adapted to move snow off the inner surface of the endless drive track during travel of the snowmobile on a snow-covered ground.

In accordance with another aspect of the present invention there is a snowmobile which comprises a chassis including a rear tunnel, an engine mounted on the chassis, and at least one slide rail supported by the rear tunnel. An endless drive track driven by the engine is in sliding contact with the at least one slide rail, and has a portion of an inner surface thereof extending laterally and outwardly past the slide rail. The snowmobile further includes a snow remover for removing snow from the portion of the inner surface of the endless drive track.

The snow remover is preferably attached to a portion of a rear suspension system at each side thereof, and extends toward the endless drive track in a close relationship with the portion of the inner surface of the endless drive track, thereby effectively removing snow lying upon the inner surface of the endless drive track when the endless drive track is turning.

The present invention advantageously provides a simple device which can be easily attached to a snowmobile, to effectively remove snow lying upon the inner surface of the lower section of the endless drive track, and thereby effectively prevent snow from being thrown upwardly and forwardly from the rear turning point of the endless drive track, onto the snowmobile passenger or driver. The freezing problem of the endless drive track is minimized because the snow remover of the present invention maintains a relatively clean condition of the endless drive track at a portion of the inner surface adjacent to the lateral edges of the slide rails.

BRIEF DESCRIPTION OF THE DRAWINGS

Having thus generally described the nature of the present invention, reference will now be made to the accompanying drawings, showing by way of illustration the preferred embodiments thereof, in which.

DETAILED DESCRIPTION OF THE PREFERRED EMBODIMENT

Figure 1:
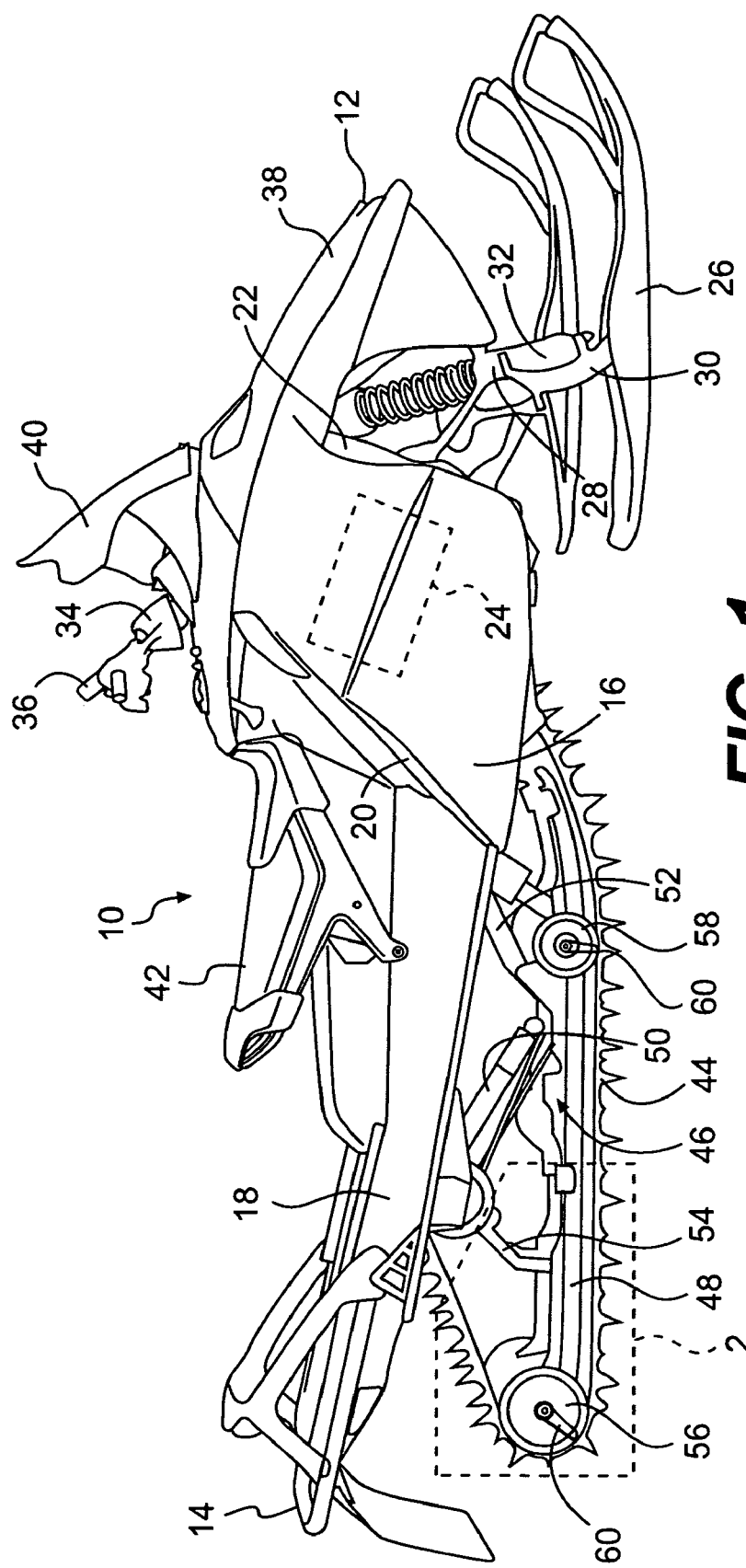
FIG. 1 is a schematic side view of a snowmobile incorporating one embodiment of the present invention.

Referring now in detail to the drawings, and primarily to FIG. 1, a snowmobile incorporating the present invention is identified generally by the reference numeral 10. The snowmobile 10 includes a forward end 12 and a rearward end 14, which are defined consistently with the travel direction of the vehicle. The snowmobile 10 further includes a chassis 16 which normally includes a rear tunnel 18, an engine cradle portion 20 and a front suspension assembly portion 22. An engine 24 which is schematically illustrated by broken lines is mounted to the engine cradle portion 20 of the chassis 16. A ski and steering assembly (not indicated) is provided, in which two skis 26 are positioned at the front end 12 of the snowmobile 10, and are attached to the front suspension assembly portion 22 of the chassis 16 through a front suspension assembly 28. The front suspension assembly 28 includes ski legs 30, supporting arms 32 and ball joints (not shown) for operatively joining the respective ski legs 30, supporting arms 32 and a steering column 34. The steering column 34 at its upper end is attached to a steering device such as handlebars 36 which is positioned forward of a driver (not shown) and behind the engine 24 to rotate the ski legs 30 and thus the skis 26, in order to steer the vehicle.

At the front end 12 of the snowmobile 10 there are provided fairings 38 that not only protect the engine 24, but can also be decorated to make the snowmobile 10 more aesthetically pleasing. A windshield 40 may be connected to the fairings 38 near the front end 12 of the snowmobile 10 or may be attached directly to the handlebars 36. The windshield 40 acts as a wind screen to lessen the force of air on the driver while the snowmobile 10 is traveling. A seat 42 is provided on the rear tunnel 18 to position the driver and any rider of the vehicle.

An endless drive track 44 is positioned at the rear end 14 of the snowmobile 10, and is disposed under rear tunnel 18, being connected operatively to the engine 24. Thus, the endless drive track 44 is driven to run about a rear suspension assembly 46 for propulsion of the snowmobile 10. The rear suspension assembly 46 includes a pair of slide rails 48 in sliding contact with the endless drive track 44. The rear suspension assembly 46 also includes one or more shock absorbers 50 which may further include a coil spring (not shown) surrounding the individual shock absorbers 50. Front and rear suspension arms 52, 54 are provided to attach the slide rails 48 to the chassis 16. One or more idler wheels which include a pair of rear idler wheels 56 and a pair of other idler wheels 58, are also provided in the rear suspension assembly 46. A snow remover 60 is attached to the rear suspension assembly 46 at each of the idler wheels 56, 58, which will be further described with reference to other figures.

Figure 2:
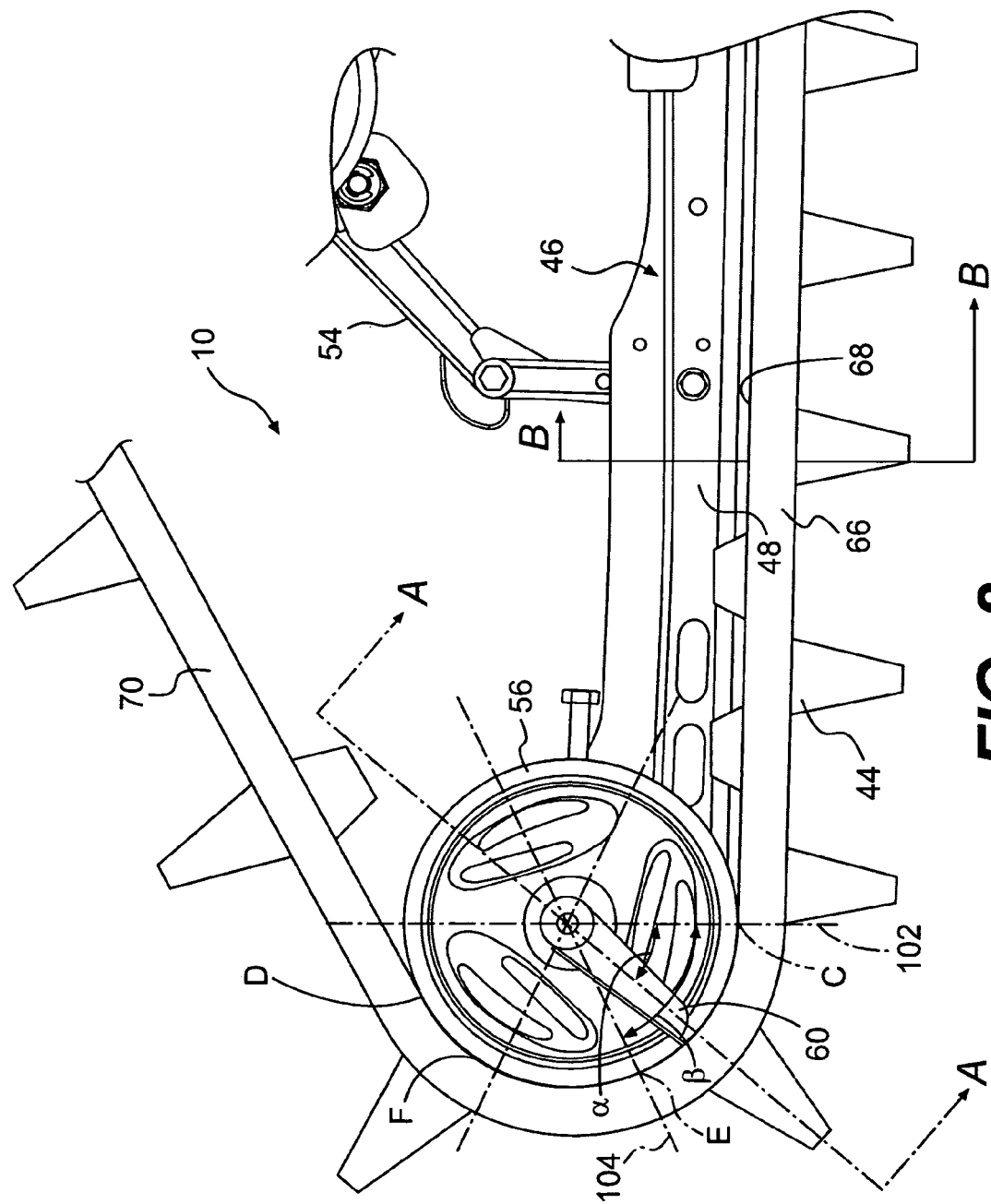
FIG. 2 is an enlarged portion of the snowmobile, indicated by numeral 2 in FIG. 1, showing the details of this embodiment.
Figure 3:
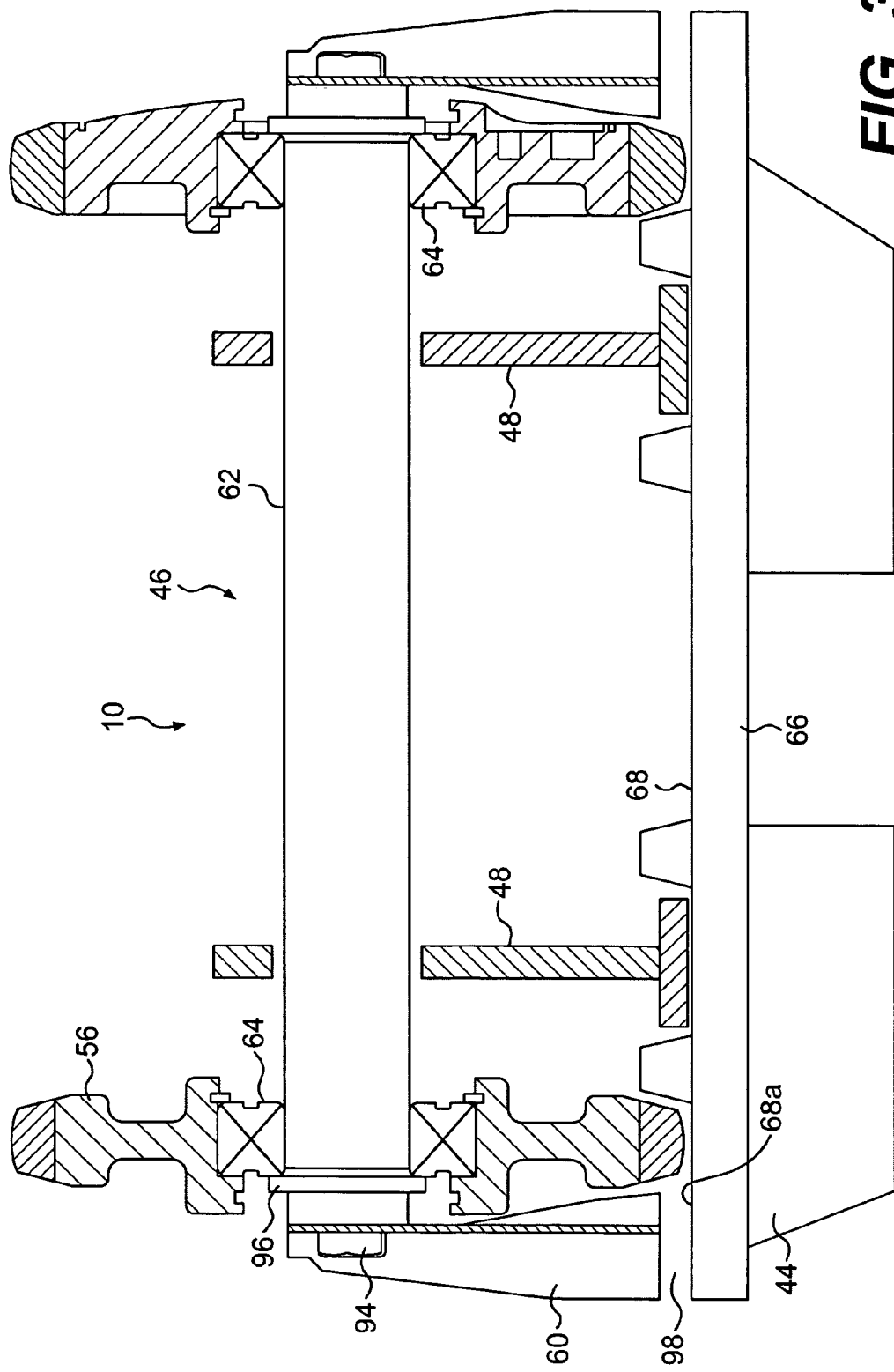
FIG. 3 is a cross-sectional view of the snowmobile of FIG. 1, taken along line A-A in FIG. 2.

In FIGS. 2-3, slide rails 48 are disposed in a parallel relationship at opposed sides of the snowmobile 10. The parallel slide rails 48 support a rear idler wheel axle 62 which extends laterally with respect to the snowmobile 10. The axle 62 and the slide rails 48 together form a stationary structure of the snowmobile 10. The axle 62 rotatably supports the pair of rear idler wheels 56 at the opposed ends thereof, by means of a pair of bearings 64. The structure illustrated in FIG. 3 is symmetrical about its vertical centerline (not shown), and therefore only one side of the configuration of the snowmobile 10 in this portion will be described for the sake of precision and convenience of description.

The endless drive track 44 has a lower section 66 which is in contact with the ground, and an inner surface 68 in sliding contact with the slide rail 48. A portion 68a of the inner surface 68 extends laterally and outwardly past the slide rail 48 and is therefore usually covered by snow (not illustrated). The snow lying upon the portion 68a of the inner surface 68 moves rearwardly together with the lower section 66 of the endless drive track 44, toward the rear idler wheel 56. The endless drive track 44 has a rear idler wheel contacting section between points C and D. It is to be understood that contact point D will vary with the movement of the rear suspension assembly 46. Between points C and D, the lower section 66 of the endless drive track 44 changes direction from travelling rearward to travelling forward to run as an upper section 70 of the endless drive track 44. Snow lying upon the portion 68a of the inner surface 68 will pick up momentum during its movement with the lower section 66. Between the contact points C and D, the snow moving with the track 44 will reach a certain point, for example point E, where a majority of the snow will be thrown away from the inner surface 68 in a tangential direction.

With the snow remover 60 installed on a stationary structure of the snowmobile, which in this embodiment is attached to an end of the rear idler wheel axle 62, a majority of the snow moving along with the lower section 66 of the endless drive track 44 will be scraping away from the track and thus prevented from being thrown up onto the seat or the passengers of the vehicle. It is contemplated that the snow will either be prevented from traveling with the endless track 44 beyond the snow remover 60 or will be pushed off the inner surface 68 altogether. Either way, the snow will not be thrown away from the endless track 44.

Figure 4A:
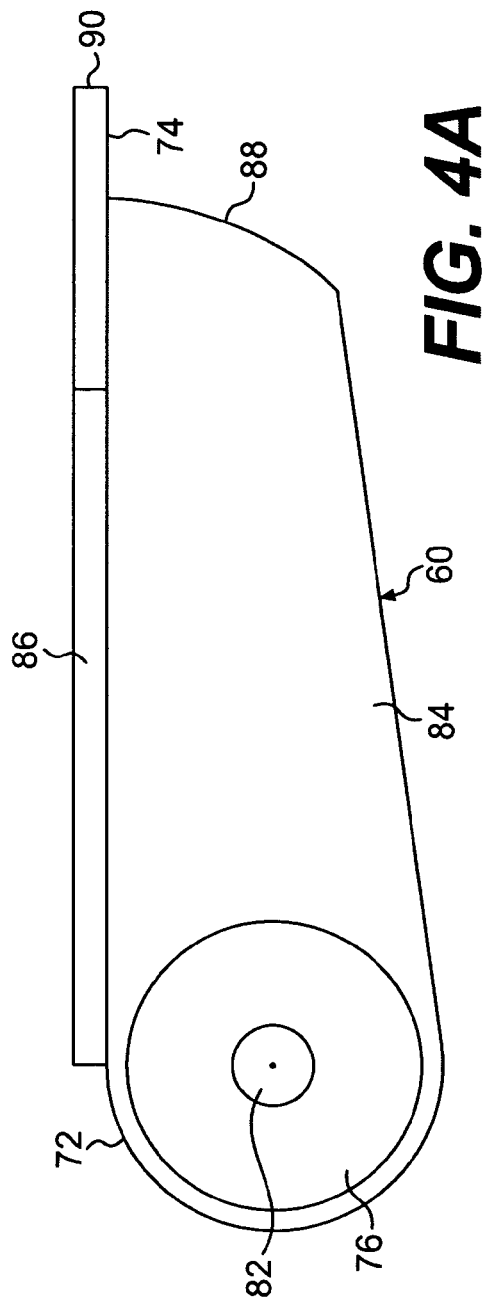
FIG. 4A is a top view of the snow remover used in the embodiment of the present invention illustrated in FIG. 3.
Figure 4B:
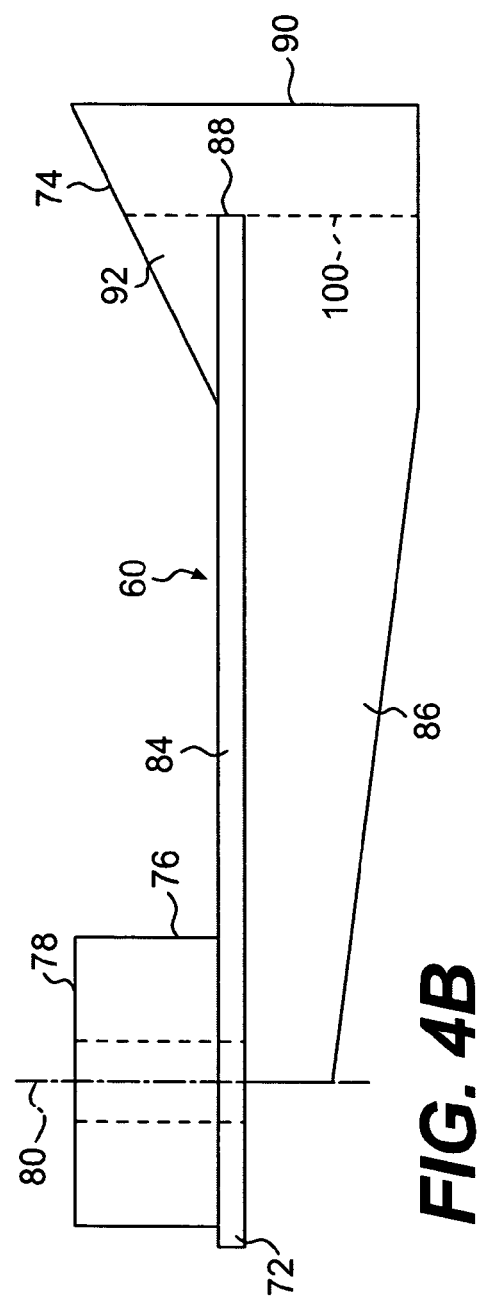
FIG. 4B is a side view of the snow remover of FIG. 4A.

FIGS. 4A and 4B illustrate the configuration of the snow remover 60 which is used in the embodiment of FIGS. 2 and 3. The snow remover 60 is preferably an integrated rigid part, for example, a metal part fabricated in a casting process. The snow remover 60 generally includes a mounting portion 72 adapted to be attached to a stationary structure of the snowmobile, and a snow removing portion or scraping portion 74 extending towards the inner surface 68 of the endless drive track when attached to the snowmobile 10. The scraping portion 74 is adapted to scrape snow off the inner surface 68 of the endless drive track during travel of the snowmobile 10. More particularly the mounting portion 72 of the snow remover 60 includes a cylindrical body 76 having a flat mounting surface 78 disposed at one end of the cylindrical body 76 and being substantially perpendicular to a center axis 80 of the cylindrical body. An aperture 82 extends axially through the cylindrical body 76. The mounting portion 72 further includes a plate 84 attached to the end of the cylindrical body 76 opposite to the end having the flat mounting surface 78, and extends radially outwardly, and parallel to the flat mounting surface 78. A scraping plate 86 is attached to one side of the plate 84, being disposed normal with respect to the plate 84, and extends from the cylindrical body 76 along the longitudinal length of the plate 84 and past a remote end 88 of the plate 84, terminating at a flat scraping end 90. Thus, the scraping portion 74 is formed by a portion of the scraping plate 86 between the remote end 88 of the plate 84 and the flat scraping end 90 of the scraping plate 86.

The flat scraping end 90 is preferably disposed in a normal relationship with respect to the flat mounting surface 78, such that the flat scraping end 90 is substantially parallel to the portion 68a of the inner surface 68 of the endless drive track 44 of FIG. 3 when the snow remover 60 is mounted to the end of the rear idler wheel axle 62. The scraping plate 86 has an enlarged portion 92 at the flat scraping end 90 such that the flat scraping end 90 has a dimension similar to the distance between the outer lateral edge of the rear idler wheel 56 and the outer lateral edge of the lower section 66 of the endless drive track 44, in order to substantially remove the snow lying upon the portion 68a of the inner surface 68 of the endless drive track 44.

The flat scraping portion 90 could also be installed at an angle with the slide rail 48 while still being normal to the inner surface 68. This would prevent snow buildup in front of the snow scraper 60 and thus force the snow away from the inner surface 68 off the endless track 44.

The snow remover 60 is attached to the end of the rear idler wheel 56 by a mounting screw 94 which, as illustrated in FIG. 3, extends through the aperture 82 of the cylindrical body 76 and a center opening (not shown) of a retaining plate 96. The mounting screw 94 threadedly engages a mounting hole (not shown) in the end of the axle 62. The snow remover 60 is dimensioned such that when it is installed in position, the scraping portion 74 extends towards the portion 68a of the inner surface 68 of the endless drive track 44 to maintain a small clearance 98 (See FIG. 3) between the flat scraping end 90 and the portion 68a of the inner surface 68, thereby achieving efficient removal of snow lying on the inner surface 68. It is contemplated that the flat mounting surface could include protrusion or indentations which would cooperate with indentations or protrusions on the axle 62 thus further preventing the snow remover 60 from rotating relative to axle 62. Albeit less effective, the snow remover could be placed at and angle greater than β without deviating from the scope of the present invention.

As shown in FIG. 1, more than one snow remover 60 may be mounted to each side of the snowmobile 10. For example, a second snow remover 60 may be attached to an axle (not indicated) of another idler wheel 58 disposed forward of the rear idler wheel 56.

The snow remover 60 when attached to the rear idler wheel axle 62, is preferably positioned at an angle indicated by the letter a, with respect to a vertical line 102 extending downwardly from a center of the rear idler wheel axle 62 as illustrated in FIG. 2. The angle α is preferably smaller than angle β, at which snow on the portion 68a of the inner surface 68 of endless drive track 44 would be thrown away therefrom, if the snow remover 60 was not attached. The angle β is defined between the line 102 and line 104 extending from the center of the rear idler wheel axle 62 through the point E. Both angles β and α are smaller than 90°. It should be understood that when angle α is smaller than β, the snow remover 60 is positioned to remove snow lying upon the lower section 66 of the endless drive track 44 before the snow reaches the point E where it would begin to be thrown away therefrom.

Alternatively, the snow remover 60 may include a rigid mounting portion and a flexible scraping portion. For example, as illustrated in FIG. 4A and 4B, the rigid mounting portion 72 includes the cylindrical body 76, the plate 84 and the majority of the scraping plate 86. A minor portion of the scraping plate 86 defined between broken line 100 and the flat scraping end 90, forms a flexible scraping portion 74 which is removably attached to the majority portion of the scraping plate 86 by any well known means. The rigid portion of the snow remover 60 can be made of a metal material, and the flexible scraping portion 74 can be made, for example, of rubber or plastic. The snow remover 60 with the flexible scraping portion 74 should have a dimension longer than the rigid integral snow remover, such that when attached to the axle 62, the flat scraping end 90 of the flexible scraping portion 74 is in contact with the portion 68a of the inner surface 68 of the endless drive track 44 of FIG. 3. This direct contact feature makes the snow remover remove snow more efficiently. However, the flat scraping end 90 of the flexible scraping portion 74 is subject to wear, and replacement of the flexible scraping portion is required.

Figure 5:
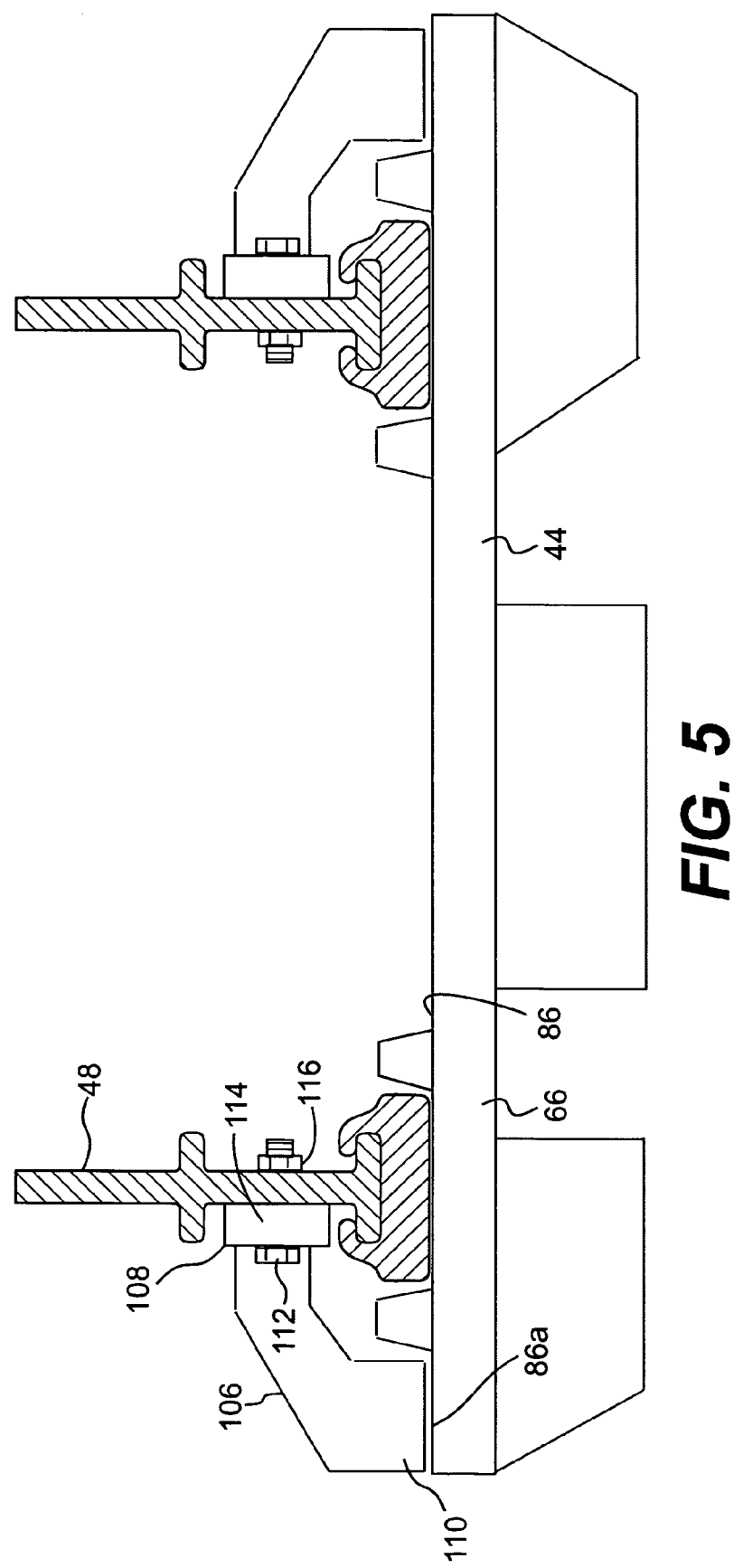
FIG. 5 is a cross-sectional view of the snowmobile of FIG. 1, taken along line B-B in FIG. 2, illustrating another position for the attachment of the snow remover in accordance with another embodiment of the present invention.

FIG. 5 illustrates another embodiment of the present invention in which a snow remover 106 is attached to the outside of each slide rail 48. The parts indicated by similar numerals are the same as those illustrated in FIGS. 1-4B, which will not therefore be redundantly described. The snow remover 106 generally includes a mounting portion 108 adapted to be attached to the slide rail 48 and a scraping portion 110 extending towards the portion 86a of the inner surface 86 of the endless drive track 44. The snow remover 106 may have a geometry different from the geometry of snow remover 60 of FIGS. 4A-4B in order to fit into position for a proper snow removal function, when the snow remover 106 is mounted to the outside of the slide rail 48. The snow remover 106 is mounted to the outside of the slide rail 48 by means of bolt 112 which extends through a center opening (not shown) of a cylindrical body 114 and a hole (not shown) in the slide rail 48, and is then secured by a nut 116. Although the snow remover 106 is schematically illustrated in FIG. 5, it should be understood that the snow remover 106 is configured similar to snow remover 60 of FIGS. 4A-4B with all possible alternative options, in order to be rigid and maintain other functioning features.

Referring to FIGS. 2 and 5, the snow remover 106 can be attached in any position along the slide rail 48. However, it is preferable to position the snow remover 106 at a rear portion thereof, and the closer to the rear idler wheel 56, the better. Any snow lying upon the rear portion of the lower section 66 of the endless drive track 44 behind the snow remover 106 will not be removed by the snow remover 106 and will reach point E to be thrown upward. Thus, in order to minimize the amount of snow lying upon this rear portion of the lower section 66 of the endless drive track 44, the preferred position of the snow remover 106 is as close as possible to the rear idler wheel 56.

Modifications and improvements to the above-described embodiments of the present invention may become apparent to those skilled in the art. The snow remover may be configured differently from the specific embodiments described and illustrated above. The snow remover may also be attached to other stationary structures of the snowmobile, from which position the snow remover can scrape the snow lying upon the lower section of the endless drive track. The foregoing description is intended to be exemplary rather than limiting. The scope of the present invention is therefore intended to be limited solely by the scope of the appended claims.

I claim:
1. A snowmobile comprising:
a chassis including a tunnel;
an engine disposed on the chassis at a forward end thereof and a seat disposed on the tunnel behind the engine, the tunnel having footrests outwardly extending from either side thereof for receiving feet of a driver;
at least one ski linked to the chassis by a front suspension system;
a steering device disposed on the chassis forward of the seat and being operatively connected to the at least one ski for steering the snowmobile;

an endless drive track disposed below the tunnel and operatively connected to the engine for propulsion of the snowmobile, the endless drive track having an inner surface in sliding contact with at least one slide rail of a rear suspension system; and a snow remover for removing snow from a portion of the inner surface of the endless drive track while the snowmobile is in motion, the snow remover being attached to an axle supporting an idler wheel and extending towards the portion of the inner surface of the endless track, the snow remover being rigid and being spaced apart from the portion of the inner surface of the endless drive track by a clearance, allowing the endless drive track to run freely but effectively preventing a majority of the snow on the portion of the inner surface of the endless drive track from passing the snow remover.

2. The snowmobile as claimed in claim 1, wherein the axle supporting the idler wheel is an axle supporting a rear idler wheel.

3. The snowmobile as claimed in claim 2, wherein the snow remover extends from the axle at a first angle with respect to a vertical line extending downwardly from a center of the axle, the first angle being smaller than a second angle at which the snow on the portion of the inner surface of the endless drive track would be thrown away therefrom if the snow remover was not attached, both the first and second angle being less than 180°.

4. The snowmobile as claimed in claim 3, wherein the endless drive track has a rear idler wheel contacting section between a first point and a second point;
　wherein a first line extends from the center of the axle to the first point at a third angle with respect to the vertical line extending downwardly from the center of the axle;
　wherein a second line extends from the center of the axle to the second point at a fourth angle with respect to the vertical line extending downwardly from the center of the axle;
　wherein a range of angles is defined between the third and fourth angles; and
　wherein the first angle is within the range of angles.

5. A snowmobile comprising:
　a chassis including a tunnel;
　an engine mounted to the chassis;
　a rear suspension system attached to the tunnel, the rear suspension system including at least two slide rails disposed at opposed sides thereof;
　an endless drive track operatively connected to the engine and rotating around the rear suspension system in sliding contact with the at least two slide rails, the endless drive track having an inner surface extending laterally and outwardly past an outer edge of each of the at least two slide rails;
　a snow remover attached to at least one of the at least two slide rails and extending towards the endless drive track in a close relationship with the inner surface of the endless drive track, thereby preventing a portion of snow lying upon the inner surface of the endless drive track from passing the snow remover when the endless drive track is rotating.

6. The snowmobile as claimed in claim 5, wherein the snow remover is attached to the at least one of the at least two slide rails at a rear portion thereof.

7. A snowmobile comprising:
　a chassis including a tunnel;
　an engine disposed on the chassis at a forward end thereof and a seat disposed on the tunnel behind the engine, the tunnel having footrests outwardly extending from either side thereof for receiving feet of a driver;
　at least one ski linked to the chassis by a front suspension system;
　a steering device disposed on the chassis forward of the seat and being operatively connected to the at least one ski for steering the snowmobile;
　an endless drive track disposed below the tunnel and operatively connected to the engine for propulsion of the snowmobile, the endless drive track having an inner surface in sliding contact with at least one slide rail of a rear suspension system; and
　a snow remover for removing snow from a portion of the inner surface of the endless drive track while the snowmobile is in motion, the snow remover being attached to an axle supporting an idler wheel and extending towards the portion of the inner surface of the endless track, the snow remover comprising a flexible scraping portion in contact with the portion of the inner surface of the endless drive track, the flexible scraping portion being located between an outer surface of the idler wheel and an outer edge of the endless drive track, thereby effectively preventing the snow on the portion of the inner surface of the endless drive track from passing the snow remover when the endless drive track is rotating.

8. The snowmobile as claimed in claim 7, wherein the axle supporting the idler wheel is an axle supporting a rear idler wheel.

9. The snowmobile as claimed in claim 8, wherein the snow remover extends from the axle at a first angle with respect to a vertical line extending downwardly from a center of the axle, the first angle being smaller than a second angle at which the snow on the portion of the inner surface of the endless drive track would be thrown away therefrom if the snow remover was not attached, both the first and second angle being less than 180°.

10. The snowmobile as claimed in claim 9, wherein the endless drive track has a rear idler wheel contacting section between a first point and a second point;
　wherein a first line extends from the center of the axle to the first point at a third angle with respect to the vertical line extending downwardly from the center of the axle;
　wherein a second line extends from the center of the axle to the second point at a fourth angle with respect to the vertical line extending downwardly from the center of the axle;
　wherein a range of angles is defined between the third and fourth angles; and
　wherein the first angle is within the range of angles.

* * * * *